(12) United States Patent
Takatsuji

(10) Patent No.: US 11,196,132 B2
(45) Date of Patent: Dec. 7, 2021

(54) BATTERY CASE

(71) Applicant: Murata Manufacturing Co., Ltd., Nagaokakyo (JP)

(72) Inventor: Hideyasu Takatsuji, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 16/819,509

(22) Filed: Mar. 16, 2020

(65) Prior Publication Data

US 2020/0220148 A1 Jul. 9, 2020

Related U.S. Application Data

(63) Continuation of application No. PCT/JP2018/041514, filed on Nov. 8, 2018.

(30) Foreign Application Priority Data

Nov. 21, 2017 (JP) .............................. JP2017-223765

(51) Int. Cl.
*H01M 50/20* (2021.01)
*H01M 50/531* (2021.01)
*H01M 50/543* (2021.01)

(52) U.S. Cl.
CPC ......... *H01M 50/543* (2021.01); *H01M 50/20* (2021.01); *H01M 50/531* (2021.01)

(58) Field of Classification Search
CPC ... H01M 50/20; H01M 50/543; H01M 50/531
See application file for complete search history.

(56) References Cited

U.S. PATENT DOCUMENTS 1,737,445 A * 11/1929 Herman .................. H01M 6/44
429/159
3,522,105 A * 7/1970 Sabatino ............. H01M 50/172
429/182

(Continued)

FOREIGN PATENT DOCUMENTS

JP H07320718 A 12/1995
JP 2000260420 A 9/2000

(Continued)

OTHER PUBLICATIONS

Machine Translation of: JP 2015/197993A, Abe et al., Nov. 9, 2015.*

(Continued)

*Primary Examiner* — Kenneth J Douyette
(74) *Attorney, Agent, or Firm* — Arent Fox LLP

(57) ABSTRACT

A battery case that includes an outer case that houses a battery, and an output terminal on an outer side of the outer case and having a first flat plate portion defining a first bolt insertion hole, and a second flat plate portion orthogonal to the first flat plate portion. The battery case and the output terminal define therebetween a first nut holding portion configured to hold a nut between the second flat plate portion of the output terminal and the first nut holding portion, the first nut holding portion having a sloped shape where a distance between the first nut holding portion and the second flat plate portion of the output terminal is shorter on a back side than on a front side thereof along a nut insertion direction.

12 Claims, 6 Drawing Sheets

(56) References Cited

U.S. PATENT DOCUMENTS

| | | | | |
|---|---|---|---|---|
| 4,563,402 A * | 1/1986 | Kobayashi | .......... | H01M 50/166 |
| | | | | 429/178 |
| 4,929,518 A * | 5/1990 | Yoshinaka | .......... | H01M 10/126 |
| | | | | 429/54 |
| 2014/0030586 A1* | 1/2014 | Tononishi | .......... | H01M 50/528 |
| | | | | 429/179 |

FOREIGN PATENT DOCUMENTS

| JP | 2002231218 A | 8/2002 |
|---|---|---|
| JP | 2003077454 A | 3/2003 |
| JP | 2015197993 A | 11/2015 |

OTHER PUBLICATIONS

International Search Report Issued for PCT/JP2018/041514, dated Feb. 12, 2019.

Written Opinion of the International Searching Authority issued for PCT/JP2018/041514, dated Feb. 12, 2019.

* cited by examiner

BATTERY CASE

CROSS REFERENCE TO RELATED APPLICATIONS

The present application is a continuation of International application No. PCT/JP2018/041514, filed Nov. 8, 2018, which claims priority to Japanese Patent Application No. 2017-223765, filed Nov. 21, 2017, the entire contents of each of which are incorporated herein by reference.

FIELD OF THE INVENTION

The present invention relates to a battery case that houses a battery.

BACKGROUND OF THE INVENTION

A battery case that houses a battery is known.

As one of such battery cases, Patent Document 1 discloses a battery case in which a resin coating is provided at one end of an output terminal, and this resin coating is fitted into a recess provided in the battery case and fused so as to attach the output terminal thereto.

The battery case of this Patent Document 1 is configured such that a bolt insertion hole is provided in the output terminal, and a bolt inserted into the bolt insertion hole and a nut is fastened to the bolt to connect an external output line to the output terminal. Further, a nut receiving surface on which the nut can be placed is provided in order to prevent the nut from falling when the nut is fastened to the bolt.

Patent Document 1: Japanese Patent Application Laid-Open No. 2003-77454

SUMMARY OF THE INVENTION

However, in the battery case described in Patent Document 1, when inserting the nut to the fastening position to the bolt, if the battery case is tilted so that the front side is lower than the back side in the nut insertion direction, the nut falls and the external output line is not easily secured to the output terminal.

The present invention solves the above-described problem, and has an object to provide a battery case that can suppress the fall of the nut even when the battery case is tilted in the nut insertion direction when the nut is fastened.

The battery case of the present invention includes: an outer case that houses a battery; and an output terminal on an outer side of the outer case, the output terminal including a first flat plate portion defining a first bolt insertion hole, and a second flat plate portion orthogonal to the first flat plate portion, wherein the battery case and the output terminal define a first nut holding portion configured to hold a nut between the second flat plate portion of the output terminal and the first nut holding portion, and the first nut holding portion has a sloped shape where a distance between the first nut holding portion and the second flat plate portion of the output terminal is shorter on a back side thereof than on a front side thereof along a nut insertion direction.

A second bolt insertion hole is preferably formed in the second flat plate portion of the output terminal, and the battery case and the output terminal define therebetween a second nut holding portion configured to hold the nut between the first flat plate portion of the output terminal and the second nut holding portion, and the second nut holding portion may have a sloped shape where a distance between the second nut holding portion and the first flat plate portion of the output terminal is shorter on a back side thereof than on a front side therein in the nut insertion direction.

The second bolt insertion hole is preferably configured so that a bolt can be inserted in a vertical direction, and the battery case further preferably includes a nut placing portion for placing a nut to be fastened to the bolt inserted into the second bolt insertion hole, and the nut placing portion may be configured to have a stepped shape.

The output terminal preferably has one end thereof that penetrates an inside of the outer case, and the battery case may further include a sealing resin that covers the one end of the output terminal penetrating the inside of the outer case.

The output terminal preferably has the other end thereof penetrating an inside of the outer case, and an elastic body is preferably disposed between the output terminal and the outer case where the other end of the output terminal penetrates the outer case, and the other end side of the output terminal is preferably configured to be connected to a battery housed in the battery case.

The battery case may further include a stopper for regulating a depth position of the nut in the nut insertion direction.

According to the battery case of the present invention, since the first nut holding portion holding a nut has a sloped shape so that a distance between the first nut holding portion and the second flat plate portion of the output terminal is shorter on the back side than on the front side in the nut insertion direction, the nut inserted in the insertion direction is sandwiched and fixed between the first nut holding portion and the second flat plate portion. Thereby, even when a battery case is tilted, falling out of the nut can be suppressed.

DETAILED DESCRIPTION OF THE INVENTION

Embodiments of the present invention will be described below to specifically describe features of the present invention.

Figure 1:
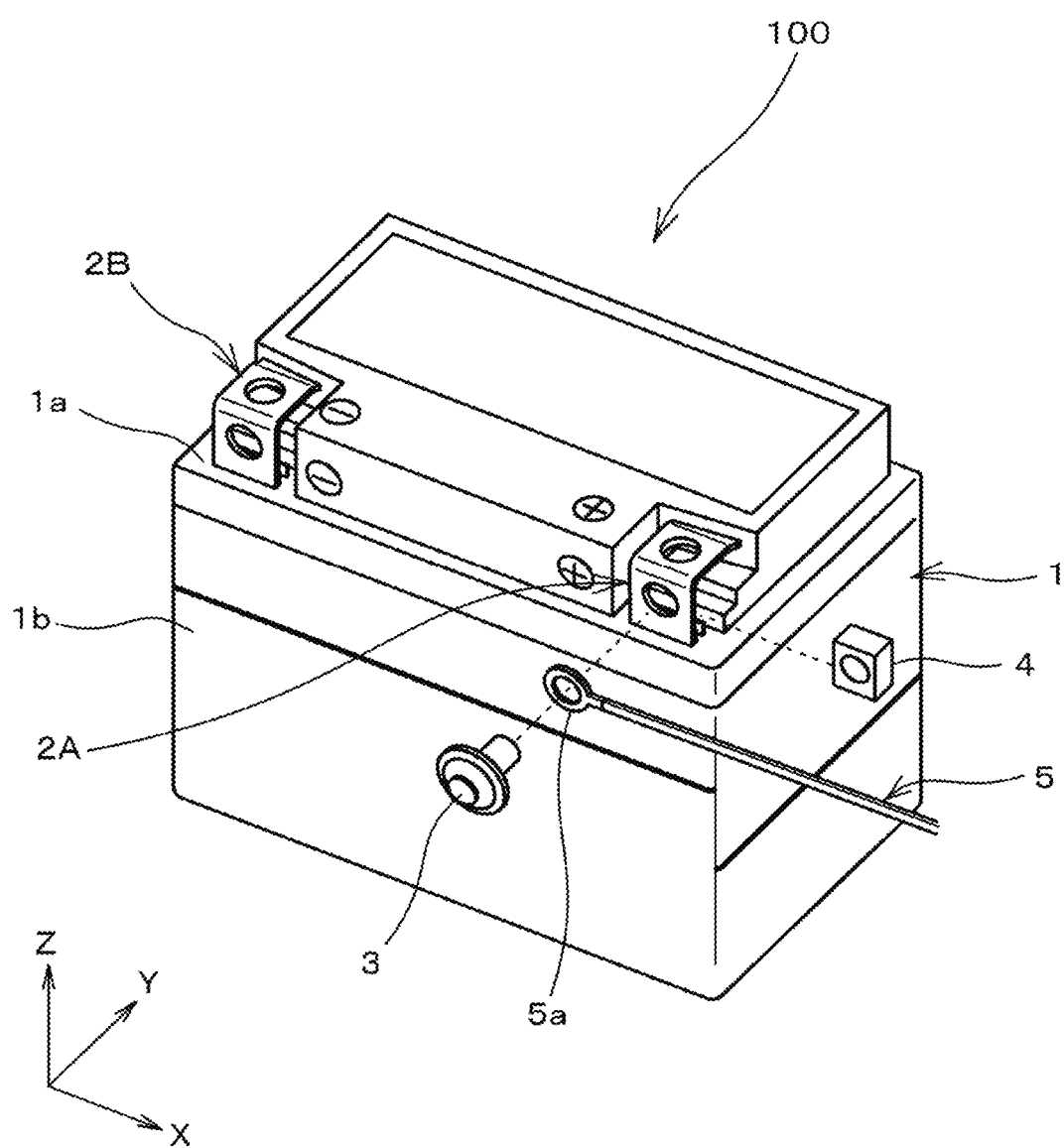
FIG. 1 is a perspective view of a battery case in one embodiment.
Figure 2:
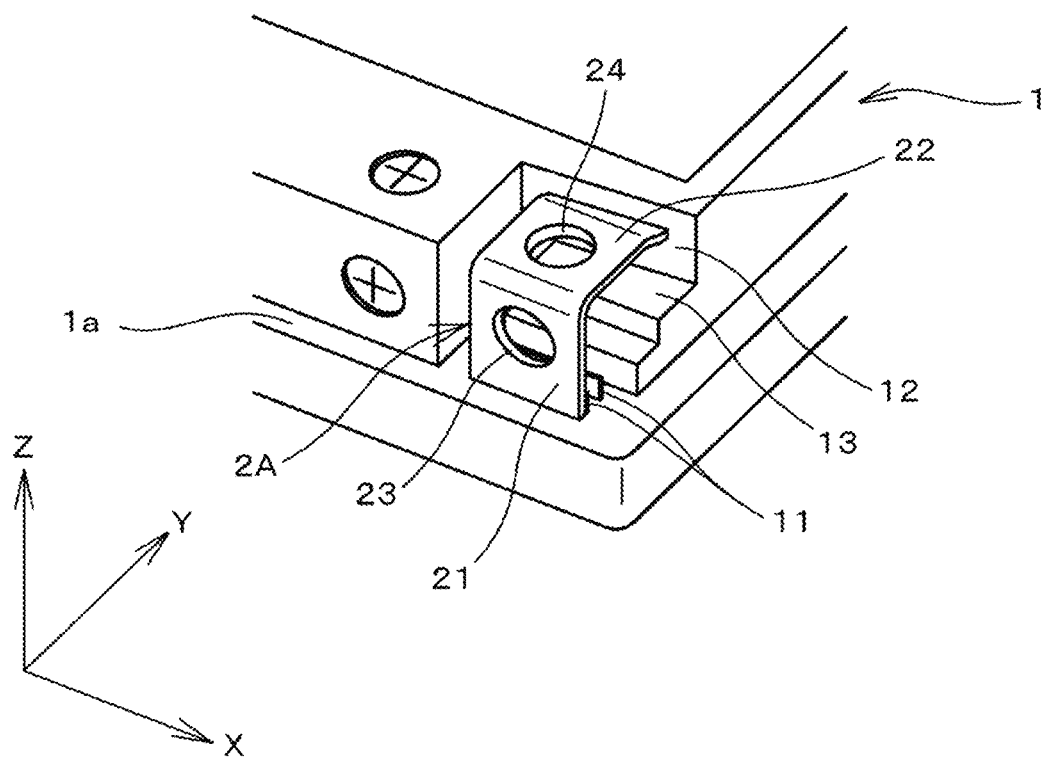
FIG. 2 is a perspective view showing a main part of the battery case in one embodiment.
Figure 3:
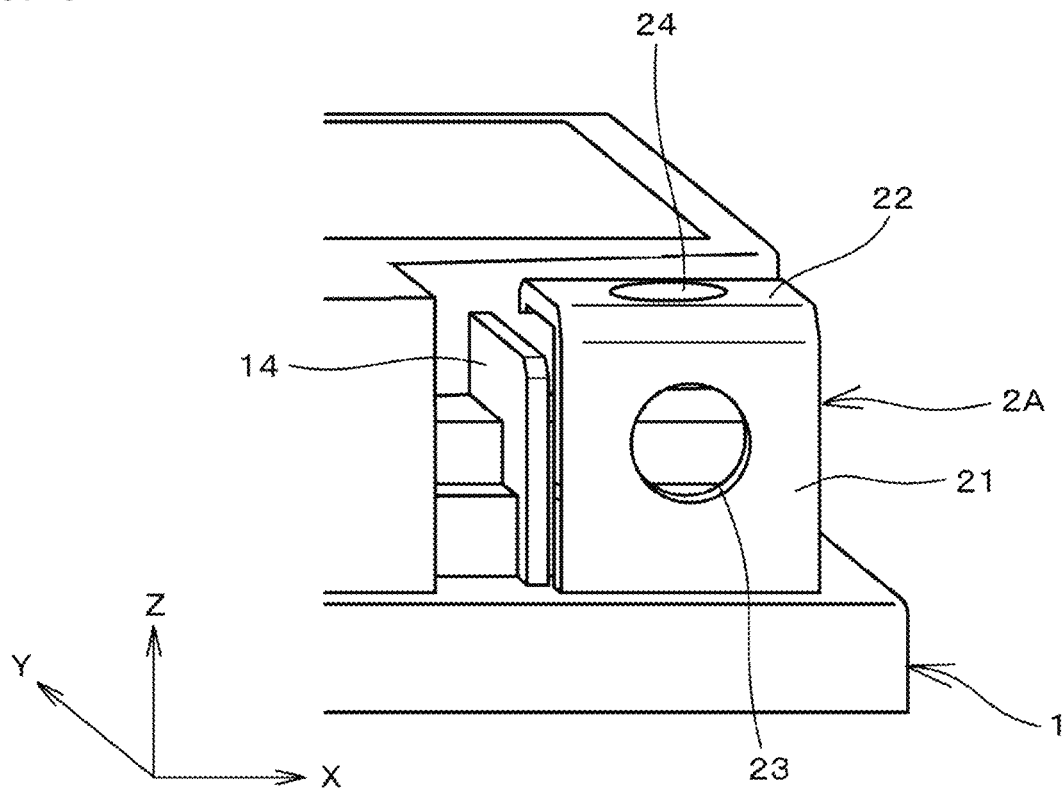
FIG. 3 is a perspective view of the main part of the battery case in one embodiment as seen from another angle.

FIG. 1 is a perspective view of a battery case 100 in one embodiment. FIG. 2 is a perspective view showing a main part of the battery case 100 in one embodiment, and FIG. 3 is a perspective view of the main part of the battery case 100 in one embodiment as seen from another angle.

An outer case 1 is a case that houses a battery (not shown), and is constituted by, for example, a housing part that can house a battery and a lid part. In the present embodiment, the outer case 1 is made of resin. The battery housed in the outer case 1 may be a single battery or an assembled battery.

A pair of output terminals 2A and 2B are provided on the outside of the outer case 1, specifically on the upper surface 1a of the outer case 1. The output terminals 2A and 2B are made of, for example, brass having higher rigidity than pure copper.

In the present embodiment, the resin outer case 1 and the pair of output terminals 2A and 2B are manufactured by insert molding.

One of the pair of output terminals 2A and 2B is a positive terminal, and the other is a negative terminal. In the present embodiment, the output terminal 2A is a positive terminal and is electrically connected to the positive electrode of the battery. The output terminal 2B is a negative terminal and is electrically connected to the negative electrode of the battery.

In the following description, when the output terminal 2A and the output terminal 2B are described without distinction, they are described as "output terminal 2".

Figure 4:
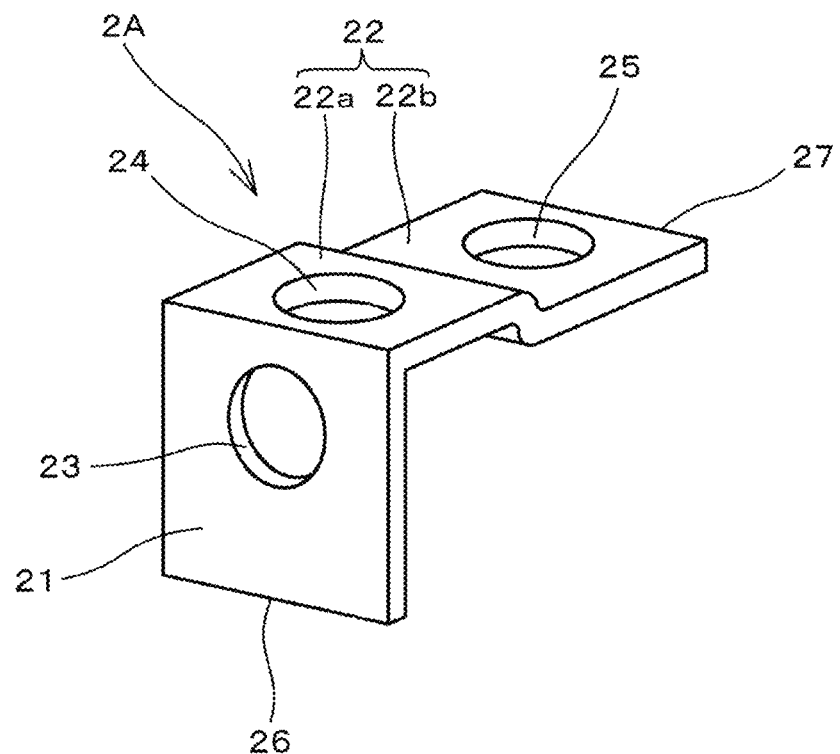
FIG. 4 is a perspective view showing an external shape of an output terminal.

FIG. 4 is a perspective view showing the external shape of the output terminal 2A. Hereinafter, the shape of the output terminal 2A will be described, but the output terminal 2B also has the same shape.

The output terminal 2A includes a first flat plate portion 21 and a second flat plate portion 22 orthogonal to the first flat plate portion 21. That is, the output terminal 2A has a substantially L shape.

In the present embodiment, by design, the second flat plate portion 22 is configured with a stepped shape including two flat plate portions 22a and 22b that are not on the same plane, but may be configured with a flat plate shape without a step.

A first bolt insertion hole 23 is formed in the first flat plate portion 21. A second bolt insertion hole 24 is formed in the second flat plate portion 22, more specifically, in the second flat plate portion 22a formed continuously with the first flat plate portion 21.

The second flat plate portion 22b is formed with a connection hole 25 that is used when electrically connecting to a battery (not shown).

An external output line 5 is connected to the output terminal 2A using a bolt 3 and a nut 4. Specifically, the bolt 3 is inserted through the hole of a crimp terminal 5a attached to one end of the external output line 5, and the nut 4 is fastened to the bolt 3 via the output terminal 2A, and thus the external output line 5 is connected to the output terminal 2A (see FIGS. 1 and 8).

In the present embodiment, the nut 4 has a substantially square shape when viewed in the insertion direction of the bolt 3.

In the battery case 100 in the present embodiment, the first bolt insertion hole 23 and the second bolt insertion hole 24 are formed in the output terminal 2A so that the external output line 5 can be connected to either the side surface 1b side or the upper surface 1a side of the outer case 1. In FIG. 1, the attachment direction of the bolt 3 and the nut 4 when the external output line 5 is connected to the side surface 1b side of the outer case 1 is indicated by a dotted line.

That is, the output terminal 2A is configured such that when the external output line 5 is connected to the side surface 1b side of the outer case 1, the bolt 3 is inserted into the first bolt insertion hole 23 of the output terminal 2A, and when the external output line 5 is connected to the upper surface 1a side of the outer case 1, the bolt 3 is inserted into the second bolt insertion hole 24.

The battery case 100 in this embodiment is characterized by the shapes of a first nut holding portion 11 and a second nut holding portion 12 (see FIG. 2) for holding the nut 4 for fastening to the bolt 3. Before describing the first nut holding portion 11 and the second nut holding portion 12, the output terminal 2 will be described.

Figure 5:
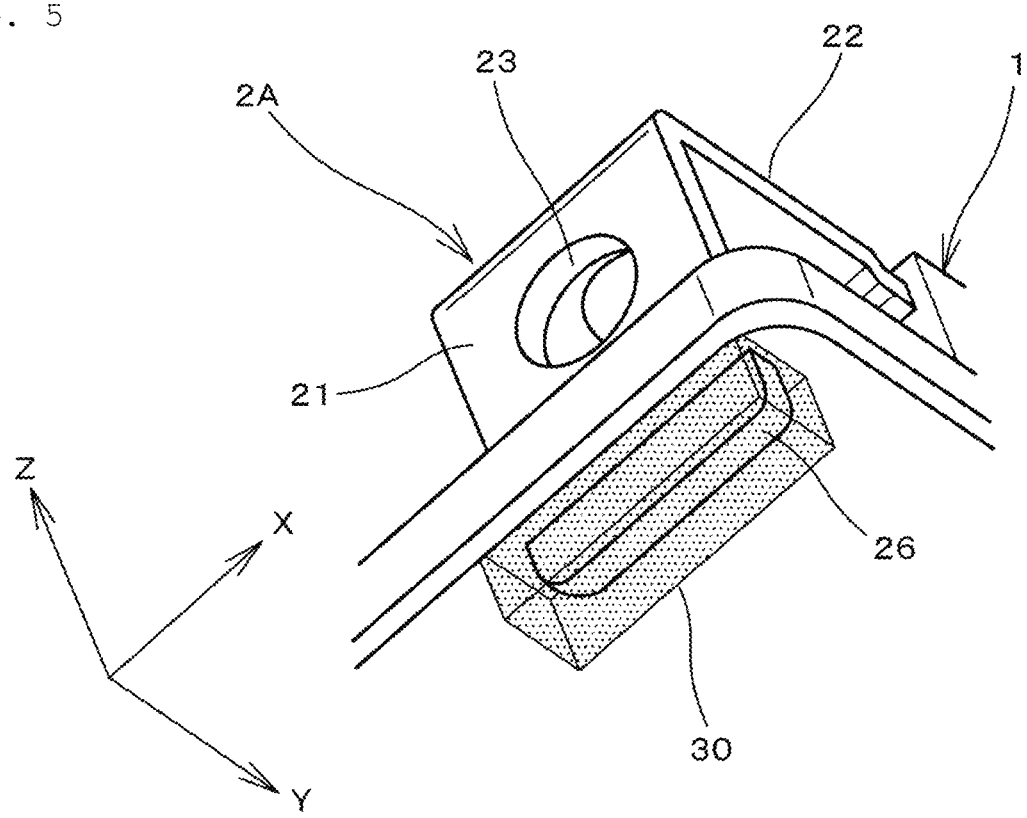
FIG. 5 is a diagram for explaining a state on one end side of the output terminal.

FIG. 5 is a diagram for explaining the state of the output terminal 2A on one end 26 side. One end 26 of the output terminal 2A is an end portion on the first flat plate portion 21 side, and is an end portion on the side not connected to the battery housed in the battery case 100.

The output terminal 2A is provided in such a form that one end 26 penetrates inside the outer case 1. A sealing resin 30 is provided so as to cover the one end 26 of the output terminal 2A penetrating inside the outer case 1. As the sealing resin 30, for example, a dispersion solution of a modified polyolefin resin or an acrylic modified silicone resin solution can be used.

The one end 26 of the output terminal 2A penetrates inward from the upper surface 1a of the outer case 1 where water tends to accumulate. In the battery case 100 in this embodiment, the sealing resin 30 covers the one end 26 of the output terminal 2A and the opening in the outer case 1 such that water is prevented from entering into the outer case 1 at the interface between the output terminal 2A and the outer case 1.

This makes it possible to prevent water from adhering to the battery housed in the outer case 1, and to improve the reliability of the battery.

Figure 6:
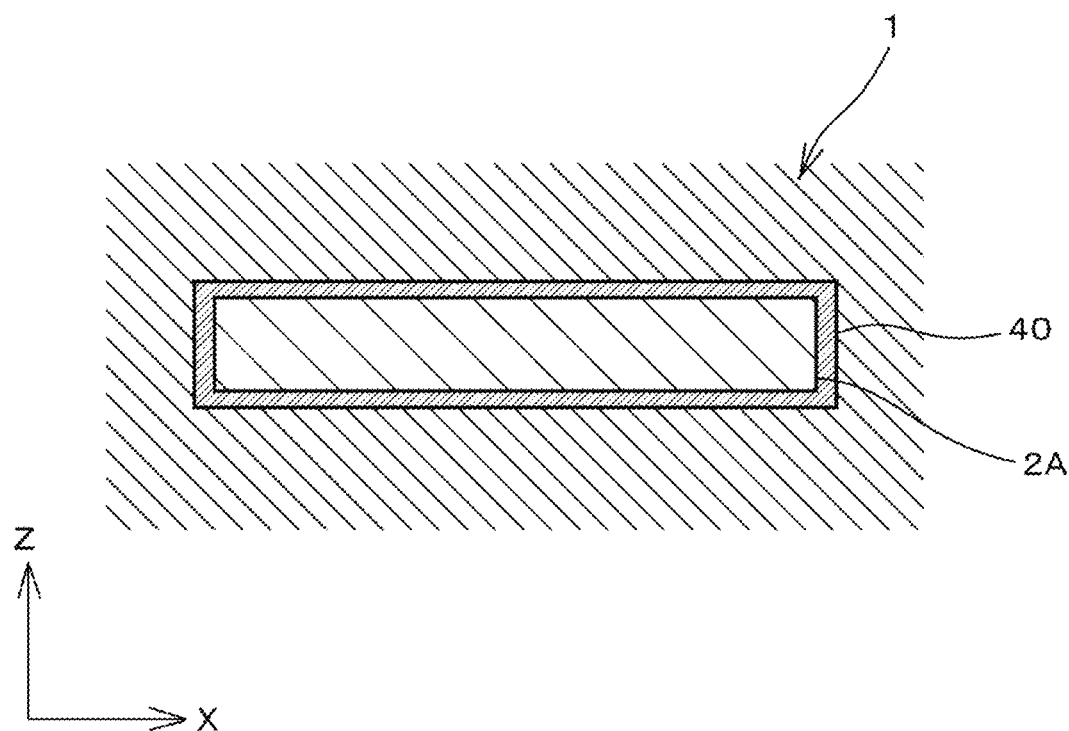
FIG. 6 is a cross-sectional view of a portion where the other end side of the output terminal penetrates an outer case.

The other end 27 on the second flat plate portion 22 side of the output terminal 2A is also provided in a form penetrating the inside of the outer case 1. The other end 27 of the output terminal 2A is an end portion on the side connected to the battery housed in the battery case 100. FIG. 6 is a cross-sectional view of a portion where the other end 27 side of the output terminal 2 penetrates the outer case 1.

An elastic body 40 that is in close contact with the output terminal 2 and the outer case 1 is provided between the output terminal 2 and the outer case 1 where the output terminal 2 penetrates the outer case 1. As the elastic body 40, for example, an elastic adhesive or an elastomer can be used.

As described above, since the elastic body 40 is provided between the output terminal 2 and the outer case 1, the stress applied between the output terminal 2 and the outer case 1 can be absorbed by the elastic body 40 when the nut 4 is fastened to the bolt 3. Thereby, when the nut 4 is fastened to the bolt 3, the interface peeling between the output terminal 2 and the outer case 1 can be suppressed.

In addition, since the elastic body 40 is provided between the resin outer case 1 and the metal output terminal 2, the interface peeling due to the difference in the linear expansion coefficient between the resin and the metal caused by heat shock or the like can be suppressed. As a result, even when used in an environment with a large temperature difference, the sealing performance between the outer case 1 and the output terminal 2 can be maintained, and water can be prevented from entering into the outer case 1.

Unlike the other end 27 side, one end 26 side of the output terminal 2 is not provided with an elastic body between the output terminal 2 and the outer case 1. That is, since the one end 26 side of the output terminal 2 is embedded and fixed in the resin outer case 1, the rotational torque applied to the output terminal 2 when the nut 4 is fastened to the bolt 3 is received on the one end 26 side, and the stress transmission to the other end 27 side connected to the battery can be suppressed.

In the battery case 100 in the present embodiment, the first nut holding portion 11 is provided outside the outer case 1 (see FIG. 2). In the present embodiment, the first nut holding portion 11 is formed integrally with the outer case 1.

The first nut holding portion 11 functions as a pedestal that supports the nut 4 from below.

The first nut holding portion 11 is configured to be able to hold the nut 4 sandwiched between the first nut holding portion 11 and the second flat plate portion 22, more specifically, the second flat plate portion 22*a* of the output terminal 2. When the nut 4 is held by the first nut holding portion 11, the bolt 3 is inserted into the first bolt insertion hole 23 of the output terminal 2.

Figure 7:
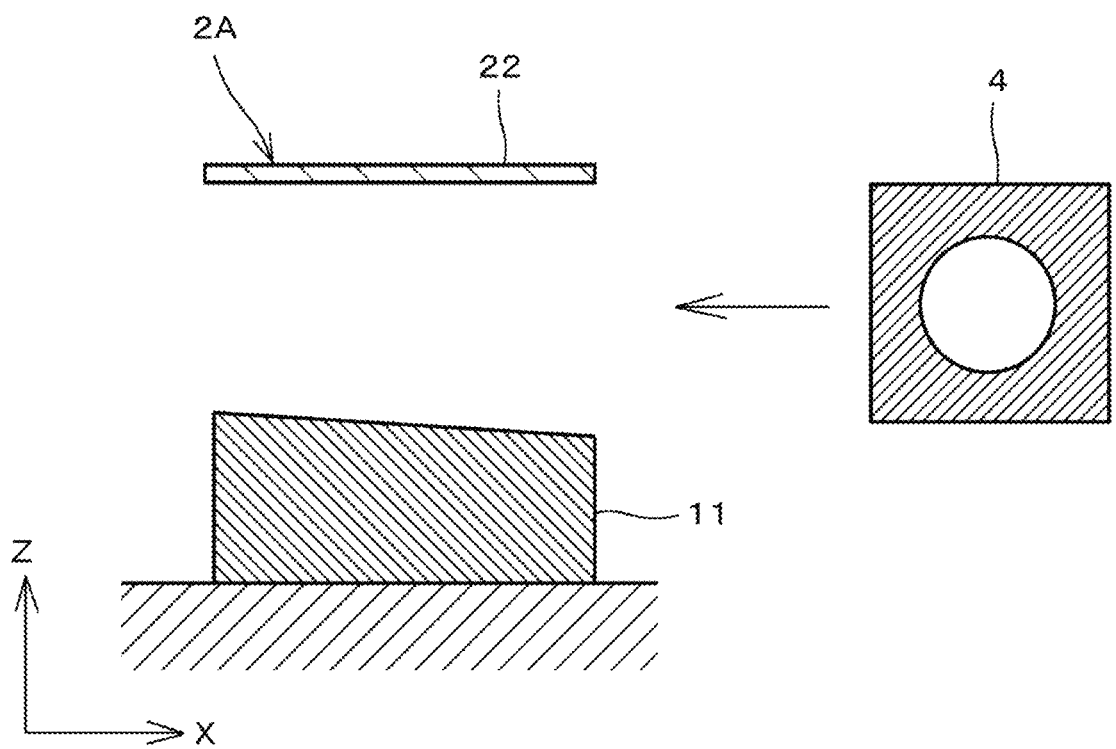
FIG. 7 is a view for explaining a shape of a first nut holding portion, and is a view of the first nut holding portion as seen from a Y-axis direction.

FIG. 7 is a view for explaining the shape of the first nut holding portion 11, and is a view of the first nut holding portion 11 as seen from the insertion direction (Y-axis direction) of the bolt 3.

In order to facilitate understanding, the first flat plate portion 21 of the output terminal 2A is omitted in FIG. 7.

As shown in FIG. 7, the first nut holding portion 11 has a sloped shape so that a minimum distance between the first nut holding portion 11 and the second flat plate portion 22*a* of the output terminal 2A becomes shorter in the insertion direction of the nut 4 indicated by the arrow in FIG. 7. Specifically, the first nut holding portion 11 is dimensioned so that the front side distance between the first nut holding portion 11 and the second flat plate portion 22*a* in the insertion direction is substantially equal to a length of one side of the nut 4, and then slopes upwardly at a gradient along the insertion direction so that a back side distance between the first nut holding portion 11 and the second flat plate portion 22*a* in the insertion direction becomes shorter than the front side distance. In the present embodiment, since the nut 4 has a substantially square shape when viewed in the insertion direction of the bolt 3, the lengths of all sides thereof are the same.

Here, the insertion direction of the nut 4 is a direction in which the nut 4 is pushed into the fastening position with the bolt 3 (X-axis direction), and is a direction orthogonal to the axial direction of the bolt 3 (Y-axis direction).

That is, when the nut 4 is placed on the first nut holding portion 11 and pushed inward, when reaching a certain position, the nut 4 is sandwiched and fixed between the first nut holding portion 11 and the second flat plate portion 22*a* of the output terminal 2A. Thereby, even when the battery case 100 is tilted so that the front side is lower than the back side in the insertion direction of the nut 4, falling out of the nut 4 can be suppressed. Further, the gradient of the first nut holding portion 11 is adjusted so that the nut 4 can be fastened to the bolt 3 at the position where the nut 4 is fixed.

Further, when the resin outer case 1 is molded using a mold, the direction in which the mold used for molding the first nut holding portion 11 is removed is opposite to the insertion direction of the nut 4. Therefore, the mold can be formed in a divergent shape that gradually broadens in the removing direction in accordance with the gradient of the first nut holding portion 11. Thereby, the outer case 1 having a stable shape can be manufactured.

In the battery case 100 in the present embodiment, a second nut holding portion 12 is provided outside the outer case 1. In the present embodiment, in the outer surface of the outer case 1, the surface through which the other end 27 of the output terminal 2A penetrates constitutes the second nut holding portion 12.

Figure 8:
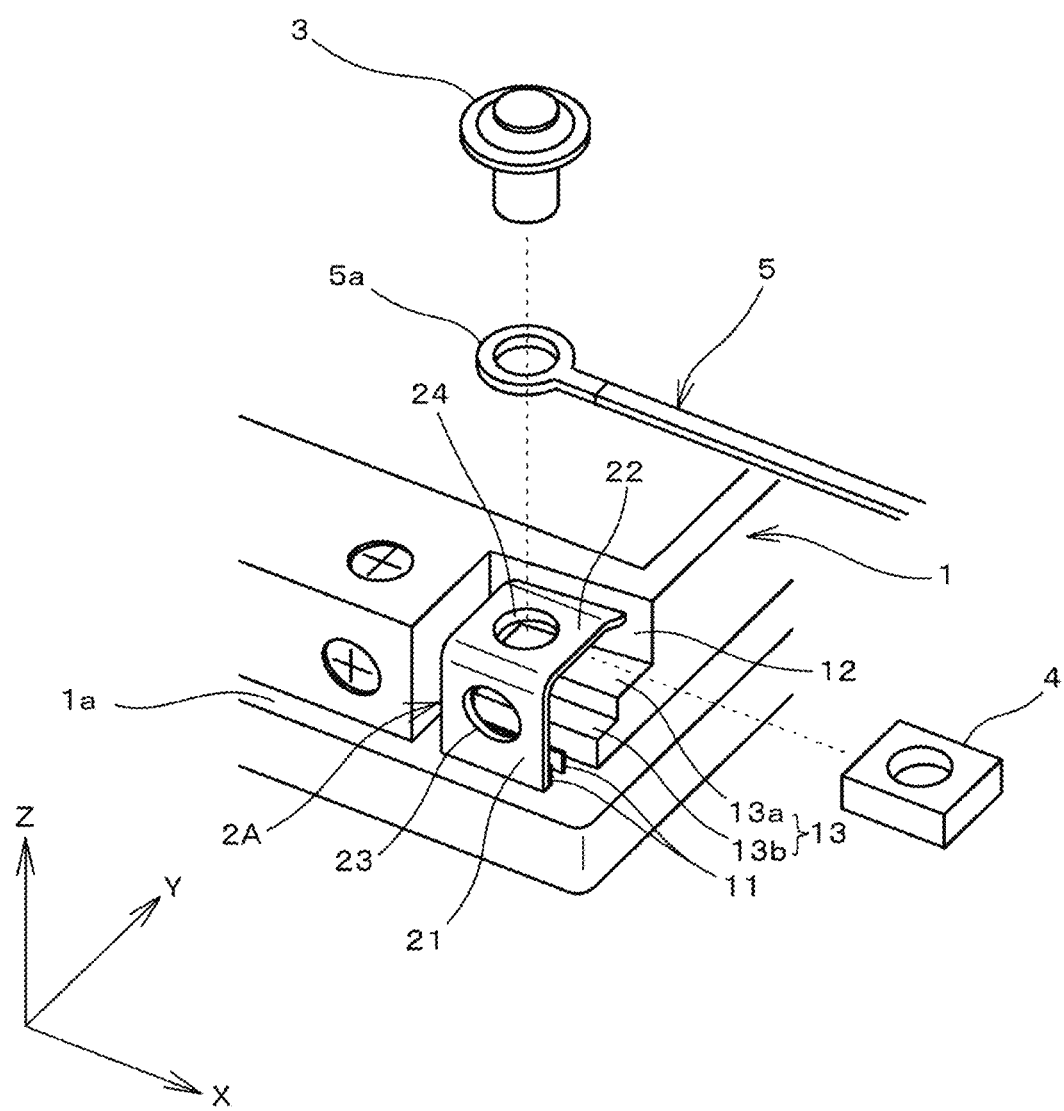
FIG. 8 is a diagram showing a direction in which bolts and nuts are attached when an external output line is connected to an upper surface side of the outer case.

FIG. 8 is a view showing the attachment direction of the bolt 3 and the nut 4 when the external output line 5 is connected to the upper surface 1*a* side of the outer case 1. In FIG. 8, the attachment direction of the bolt 3 and the nut 4 is indicated by a dotted line.

The outer case 1 is provided with a nut placing portion 13 for placing and supporting the nut 4 to be fastened to the bolt 3 inserted into the second bolt insertion hole 24. The nut placing portion 13 is composed of an upper stage portion 13*a* and a lower stage portion 13*b*, and has a stepped shape.

The upper stage portion 13*a* of the nut placing portion 13 is a portion on which the nut is placed. On the other hand, the lower stage portion 13*b* is positioned below the upper stage portion 13*a* in order to prevent interference with the bolt inserted into the first bolt insertion hole 23 and the bolt 3 inserted into the second bolt insertion hole 24. With such a structure, since the bolt 3 does not interfere with the nut placing portion 13 regardless from which of the first bolt insertion hole 23 and the second bolt insertion hole 24 the bolt 3 is inserted, it is possible to stably fasten the nut 4 to the bolt 3.

When fastening the nut 4 to the bolt 3, first, the nut 4 is pushed in the insertion direction to the fastening position with the bolt 3 in a state where the nut 4 is placed on the upper stage portion 13*a* of the nut placing portion 13. Also in this case, the insertion direction of the nut 4 is the direction in which the nut 4 is pushed into the fastening position with the bolt 3 (X-axis direction), and the direction orthogonal to the axial direction of the bolt 3 (Z-axis direction).

The second nut holding portion 12 is configured so as to be able to hold the nut 4 sandwiched between the second nut holding portion 12 and the first flat plate portion 21 of the output terminal 2A. In this case, the bolt 3 is inserted into the second bolt insertion hole 24 of the output terminal 2.

Figure 9:
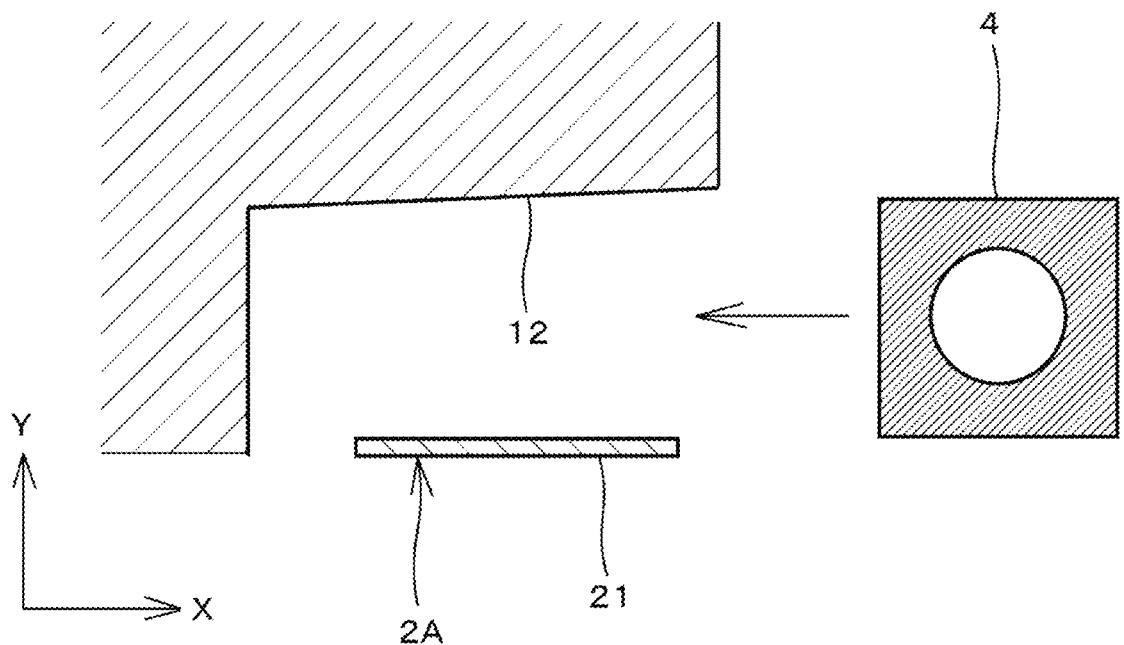
FIG. 9 is a view for explaining a shape of a second nut holding portion, and is a view of the second nut holding portion as viewed from above.

FIG. 9 is a view for explaining the shape of the second nut holding portion 12, and is a view of the second nut holding portion 12 as viewed from above. In order to facilitate understanding, the second flat plate portion 22 of the output terminal 2A is omitted in FIG. 9.

As shown in FIG. 9, the second nut holding portion 12 has a sloped shape so that a minimum distance between the second nut holding portion 12 and the first flat plate portion 21 of the output terminal 2A becomes shorter in the insertion direction (X-axis direction) of the nut 4. Specifically, the second nut holding portion 12 is dimensioned so that the front side distance between the second nut holding portion 12 and the first flat plate portion 21 in the insertion direction is substantially equal to a length of one side of the nut 4, and then slopes upwardly at a gradient along the insertion direction so that a back side distance between the second nut holding portion 12 and the first flat plate portion 21 in the insertion direction becomes shorter than the front side distance. The insertion direction of the nut 4 is a direction orthogonal to the axial direction (Z-axis direction) of the bolt 3.

That is, when the nut 4 is pushed in the insertion direction (X-axis direction), the nut 4 is sandwiched and fixed between the second nut holding portion 12 and the first flat plate portion 21 of the output terminal 2A when reaching a certain position. Thereby, even when the battery case 100 is tilted so that the front side is lower than the back side in the insertion direction of the nut 4, falling out of the nut 4 can be suppressed. The gradient of the second nut holding portion 12 is adjusted so that the nut 4 can be fastened to the bolt 3 at the position where the nut 4 is fixed.

Further, the battery case 100 in the present embodiment is provided with a stopper 14 for regulating the depth position in the insertion direction of the nut 4 (see FIG. 3).

As described above, the battery case 100 is configured such that the first nut holding portion 11 and the second nut holding portion 12 each have a sloped shape, so that the nut 4 is pushed in the insertion direction and fixed when reaching a certain position, and can be fastened to the bolt 3 at that position. When configured in this way, the nut 4 does not come into contact with the stopper 14.

However, in order to prevent the nut 4 from being fixed at a position beyond the position where the nut 4 can be fastened to the bolt 3 when the nut 4 is pushed in due to manufacturing variations of the battery case 100, the battery case 100 according to the present embodiment is preferably provided with the stopper 14. Therefore, even if the nut 4 is pushed in and comes into contact with the stopper 14, the nut 4 is configured to be able to be fastened to the bolt 3 at that position.

The present invention is not limited to the above embodiment, and various applications and modifications can be made within the scope of the present invention.

In the above embodiment, the first bolt insertion hole 23 is formed in the first flat plate portion 21 of the output terminal 2, and the second bolt insertion hole 24 is formed in the second flat plate portion 22, but a configuration in which a bolt insertion hole is formed in only one of the first flat plate portions 21 and the second flat plate portion 22 may be employed. Further, among the components of the output terminal 2, the portion extending upward from the upper surface 1a of the outer case 1 is described as the first flat plate portion 21, and the portion orthogonal to the first flat plate portion 21 is described as the second flat plate portion 22. However, a portion extending upward from the upper surface 1a of the outer case 1 may be referred to as a second flat plate portion 22, and a portion orthogonal to the second flat plate portion 22 may be referred to as a first flat plate portion.

The output terminal 2 only needs to have a shape including a first flat plate portion and a second flat plate portion orthogonal to the first flat plate portion, and is not limited to the shape shown in FIG. 4.

Figure 10:
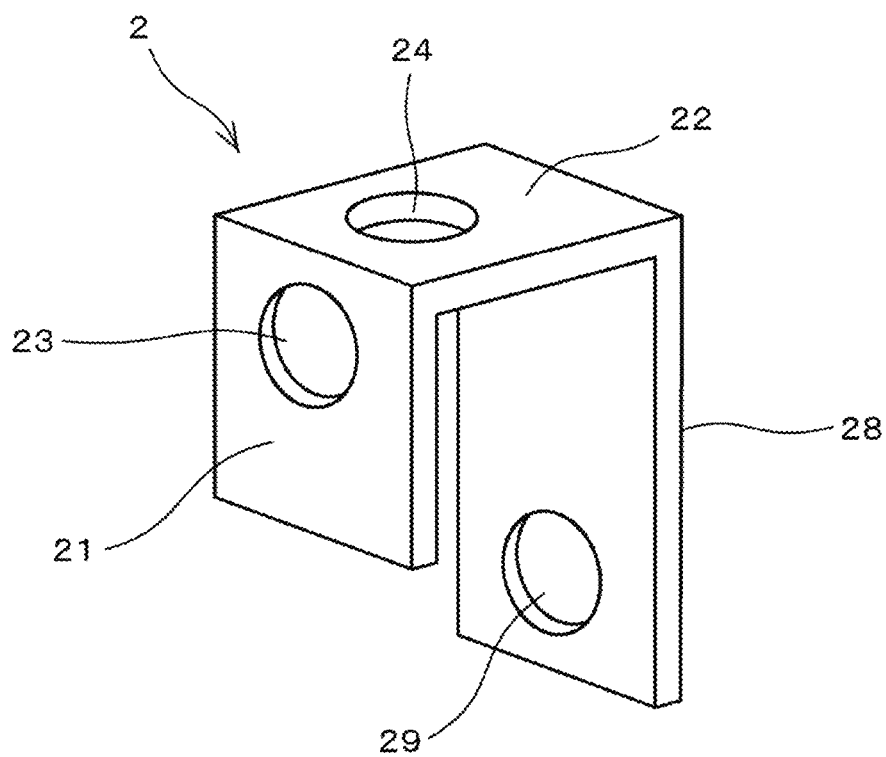
FIG. 10 is a diagram showing an example of another shape of the output terminal.

FIG. 10 is a diagram illustrating an example of another shape of the output terminal 2. The output terminal 2 shown in FIG. 10 includes the first flat plate portion 21, the second flat plate portion 22 orthogonal to the first flat plate portion 21, and a third flat plate portion 28 that is provided on the opposite side of the first flat plate portion 21 of both ends of the second flat plate portion 22 and is orthogonal to the second flat plate portion 22. A first bolt insertion hole 23 is formed in the first flat plate portion 21, and a second bolt insertion hole 24 is formed in the second flat plate portion 22. Further, the third flat plate portion 28 is formed with a connection hole 29 used for electrical connection with a battery (not shown). When the output terminal 2 shown in FIG. 10 is formed integrally with the outer case 1, the third flat plate portion 28 is positioned inside the outer case 1. Even if the shape of the output terminal 2 is as shown in FIG. 10, the same effect as that of the battery case in the above embodiment can be obtained.

The resin outer case 1 and the pair of output terminals 2A, 2B have been described as being manufactured by insert molding, but it may be configured such that the pair of output terminals 2A, 2B are attached to the outer case 1 later.

In the above-described embodiment, the shape of the nut 4 when viewed in the insertion direction of the bolt 3 is substantially square, but is not limited to a square. However, the shape of the nut 4 is preferably a shape that is easily fixed when sandwiched between the first nut holding portion 11 and the second flat plate portion 22 of the output terminal 2, or between the second nut holding portion 12 and the first flat plate portion 21 of the output terminal 2. That is, the shape of the nut 4 is preferably a shape that has a first surface in contact with the first nut holding portion 11 and a second surface in contact with the second flat plate portion 22 of the output terminal 2, or a first surface in contact with the second nut holding portion 12 and a second surface in contact with the first flat plate portion 21 of the output terminal 2.

DESCRIPTION OF REFERENCE SYMBOLS

1: Outer case
1a: Upper surface
1b: Side surface
2, 2A, 2B: Output terminal
3: Bolt
4: Nut
5: External output line
11: First nut holding portion
12: Second nut holding portion
13: Nut placing portion
14: Stopper
21: First flat plate portion
22: Second flat plate portion
23: First bolt insertion hole
24: Second bolt insertion hole
25: Connection hole
26: One end of output terminal
27: Other end of output terminal
28: Third flat plate portion
29: Connection hole
30: Sealing resin
40: Elastic body

The invention claimed is:

1. A battery case comprising:
an outer case that houses a battery; and
an output terminal on an outer side of the outer case, the output terminal including a first flat plate portion defining a first bolt insertion hole, and a second flat plate portion orthogonal to the first flat plate portion, wherein
the battery case and the output terminal define therebetween a first nut holding portion configured to hold a nut between the second flat plate portion of the output terminal and the first nut holding portion, the first nut holding portion having a sloped shape where a distance between the first nut holding portion and the second flat plate portion of the output terminal is shorter on a back side thereof than on a front side thereof along a nut insertion direction.

2. The battery case according to claim 1, wherein:
the second flat plate portion of the output terminal defines a second bolt insertion hole; and
the battery case and the output terminal define therebetween a second nut holding portion configured to hold the nut between the first flat plate portion of the output terminal and the second nut holding portion, the second nut holding portion having a sloped shape where a distance between the second nut holding portion and the first flat plate portion of the output terminal is shorter on a back side thereof than on a front side thereof along the nut insertion direction.

3. The battery case according to claim 2, further comprising:
a stepped nut placing portion on the battery case and configured to support the nut when placed in the second nut holding portion.

4. The battery case according to claim 1, wherein a first end of the output terminal penetrates to an inside of the outer case, and the battery case further includes a sealing resin that covers the first end of the output terminal in the inside of the outer case.

5. The battery case according to claim 4, wherein a second end of the output terminal penetrates to the inside of the outer case, and the battery case further includes an elastic body between the output terminal and the outer case where the second end of the output terminal penetrates the outer case.

6. The battery case according to claim 1, wherein a first end of the output terminal penetrates to an inside of the outer case, and the battery case further includes an elastic body between the output terminal and the outer case where the first end of the output terminal penetrates the outer case.

7. The battery case according to claim 1, further comprising a stopper on the outer case, the stopper positioned so as to regulate a depth position of the nut in the nut insertion direction.

8. The battery case according to claim 2, further comprising a stopper on the outer case, the stopper positioned so as to regulate a depth position of the nut in the nut insertion direction.

9. The battery case according to claim 2, wherein the second flat plate portion has a stepped shape including two portions that are not on a same plane.

10. The battery case according to claim 1, wherein the first nut holding portion is integral with the outer case.

11. The battery case according to claim 1, wherein the output terminal further includes a third flat plate portion opposite to the first flat plate portion and orthogonal to the second flat plate portion.

12. The battery case according to claim 2, wherein the output terminal further includes a third flat plate portion opposite to the first flat plate portion and orthogonal to the second flat plate portion.

* * * * *